Figure 1:
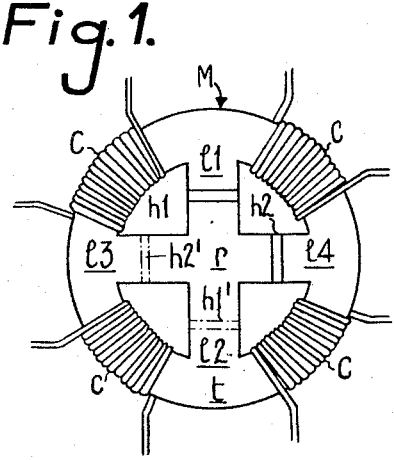

Dec. 15, 1964         R. K. P. GALPIN         3,161,845
HALL EFFECT APPARATUS
Filed May 7, 1963

United States Patent Office 3,161,845
Patented Dec. 15, 1964

3,161,845
HALL EFFECT APPARATUS
Robert Keith Portway Galpin, London, England, assignor to Associated Electrical Industries Limited, London, England, a British company
Filed May 7, 1963, Ser. No. 278,550
Claims priority, application Great Britain May 7, 1962
4 Claims. (Cl. 338—32)

According to the invention of copending application No. 243,550, there is provided a compact Hall effect apparatus comprising a magnetizing structure energizable to produce in a region bounded by the structure two intersecting magnetic fields substantially perpendicular to each other, together with a Hall effect prism located in said region for subjection to said intersecting magnetic fields and having two pairs of input electrodes lying along respective lines normal to each other in a plane through said region and a pair of output electrodes lying along a line transverse to said plane.

In the examples of such apparatus which are given in this copending application the Hall effect prism is shown as being of circular or rectangular cross-section.

However, there exists the problem that the efficiency of the apparatus, particularly when the Hall effect prism is of rectangular cross-section, that is, the prism is a cube, may be limited in view of the large air gap which is needed in the magnetizing structure to accommodate the prism. With a view to overcoming at least this problem, the invention of my copending application No. 266,400 provides a Hall effect apparatus in which the Hall effect prism is of cruciform cross-section having two pairs of electrodes respectively located at or adjacent the outer ends of opposite limbs of the prism and a further pair of electrodes located on opposite surfaces of the prism at the intersection of the limbs. With such prism the magnetizing structure of the apparatus can have pole-pieces which extend into the areas between adjacent limbs of the prism. Thus the air gap which is required between the pole-pieces is smaller than the air gap which is required when the prism is cube-shaped so that the magnetic circuit of the structure is improved.

As distinct from these forms of Hall effect apparatus of our said copending applications, the present invention provides a Hall effect apparatus employing Hall effect devices of a kind comprising a thin plate of semiconductor material having two pairs of input/output electrodes so located thereon as to permit use of the device in a manner utilizing the Hall effect exhibited by the plate. Such a device will be termed a Hall plate device and a particular form thereof likely to be particularly suited to the present invention is one in which the Hall plate is carried on a beryllia substrate, which itself may be in heat exchange relationship with a heat sink.

According to the present invention, a Hall effect apparatus comprises a magnetic structure having an outer peripheral portion and two pairs of limbs extending inwardly towards a central region, the limbs of each pair being in alignment with each other along a line substantially at right angles to the line of the other pair, magnetizing coils embracing said magnetic structure at positions appropriate for producing, on suitable energization of the coils a rotating magnetic field in said outer portion of the structure and in said central region, and at least one pair of Hall plate devices the two plates of which are accommodated in respective air gaps at such positions in the magnetic structure that the plates of the two devices of the pair will be subjected to respective in-quadrature components of said rotating magnetic field.

With the Hall effect apparatus according to the present invention, the Hall plates of the two devices of the pair may be accommodated in respective narrow air gaps provided either in adjacent limbs of the two pairs or in adjacent quadrants, as defined by said limbs, of the outer peripheral portion of the magnetic structure, the plates lying normally to the direction of the magnetic flux of the rotating magnetic field: apart from such air gaps the magnetic structure would be completely closed except that additional such air gaps may be provided to preserve magnetic symmetry, to which end said central region would be an integral part of the magnetic structure, the two pairs of limbs being united in such region to form a cross. Alternatively, the two Hall plate devices may be arranged so that their plates are in crossed relationship at right angles to each other and accommodated in said central region which in this instance would be an air space bounded by the inner ends of the two pairs of limbs. The plates of the devices when arranged in this latter manner would simulate a Hall effect prism of cruciform cross-section as described in my copending application No. 266,400.

In order that the invention may be more fully understood reference will now be made by way of example to the accompanying drawing in which:

FIGS. 1 to 4 illustrate diagrammatically different possible forms of Hall effect apparatus conforming to the invention.

Figure 2:
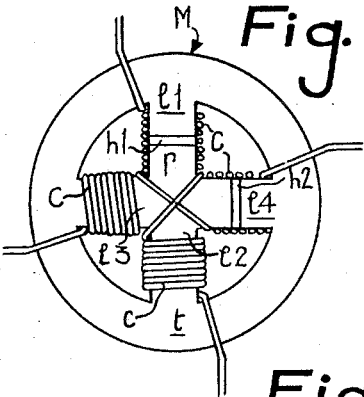
Figure 3:
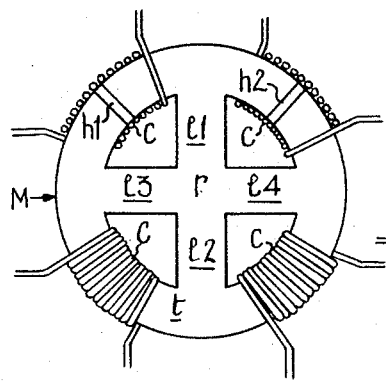

Referring to the drawing, in each of the four different forms of Hall effect apparatus shown in FIGS. 1 to 4 the apparatus has a magnetic structure M comprising an outer peripheral portion in the form of a toroid $t$ and two pairs of inwardly extending limbs $l1$, $l2$ and $l3$, $l4$, which are disposed at right angles to each other and intersect in a central region $r$ to form a cross. Wound on the magnetic structure M are energizing coils C which are appropriate for producing a rotating magnetic field within the structure M upon the application to these coils of in-quadrature energizing currents as described in copending application No. 243,550. In FIGS. 1 and 3 the coils C are wound on the toroid $t$, whereas in FIGS. 2 and 4 they are wound on the two pairs of limbs $l1$, $l2$ and $l3$, $l4$. In each of the magnetic structures M two Hall plates $h1$ and $h2$ of Hall plate devices (not otherwise represented) are accommodated in respective narrow air gaps which lie normal to the direction of the magnetic flux. In FIGS. 1 and 2 the air gaps are provided in the two adjacent limbs $l1$ and $l4$, and in FIGS. 3 and 4 they are provided in the toroid $t$ in adjacent quadrants thereof.

In each case, the two Hall plates $h1$ and $h2$ are located in the magnetic circuit of the structure M at positions where the instantaneous magnetic flux densities will be relatively in phase quadrature. Thus in response to the application of the rotating magnetic field and to input current applied to their input electrodes, these Hall plates will produce individual Hall output signals which may be combined in series or in parallel, the combined signal which results corresponding to that produced in the instances where a Hall effect prism is employed.

Figure 4:
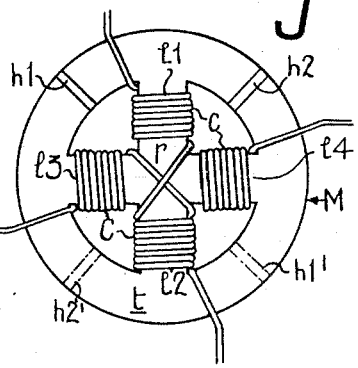

In each of the forms of apparatus shown in FIGS. 1 to 4, it may be desirable to use a further pair of Hall plate devices having their Hall plates accommodated in other air gaps provided in the magnetic structure, for instance as shown in dotted lines at $h1'$ and $h2'$ in FIGS. 1 and 4. Such other air gaps would normally be provided, whether or not additional Hall plates are used, in order to maintain symmetry in the magnetic circuit of the structure M. Although the outer peripheral portion of the magnetic structure M has been shown as a toroid in FIGS. 1 to 4, it may equally well be square or any other convenient shape.

It is envisaged that with the forms of apparatus exemplified in FIGS. 1 to 4, leak cancellation methods will be more simple to apply to the Hall plates of the individual Hall plate devices than to a three-dimensional prism. Also, due to the much reduced air gap which is required, a smaller magnetizing force will be needed for such forms of apparatus to produce a given flux density, so that coil size and coil power will be significantly reduced: thus coil design for high frequency carrier operation becomes easier.

As in the case of the Hall effect apparatus described in our said two copending applications, the Hall effect apparatus of the present invention may be employed either for modulation or demodulation purposes in the quadrature modulation and demodulation arrangements forming the subject of U.S. application No. 160,746 (W. Saraga).

What I claim is:

1. Hall effect apparatus comprising a magnetic structure having an outer peripheral portion and two pairs of limbs extending inwardly towards a central region, the limbs of each pair being in alignment with each other along a line substantially at right angles to the line of the other pair, magnetizing coils embracing said magnetic structure at positions appropriate for producing on suitable energization of the coils a rotating magnetic field in said outer portion of the structure and in said central region, and at least one pair of Hall plate devices the two plates of which are accommodated in respective air gaps at such positions in the magnetic structure that the plates of the two devices of the pair will be subjected to respective in-quadrature components of said rotating magnetic field.

2. Apparatus as claimed in claim 1 wherein the two pairs of limbs are united in said central region to form a cross and the Hall plates of the two devices are accommodated in respective narrow air gaps in adjacent limbs of the two pairs, the plates lying normally to the direction of the magnetic flux of the rotating magnetic field.

3. Apparatus as claimed in claim 1 wherein the two pairs of limbs are united in said central region to form a cross and the Hall plates of the two devices are accommodated in respective narrow air gaps in adjacent quadrants (as defined between said limbs) of the outer peripheral portion of the magnetic structure, the plates lying normally to the direction of the magnetic flux of the rotating magnetic field.

4. Apparatus as claimed in claim 1 including additional narrow air gaps for preserving magnetic symmetry of the magnetic structure.

References Cited in the file of this patent
UNITED STATES PATENTS

| | | |
|---|---|---|
| 2,902,660 | Weisshaar | Sept. 1, 1959 |
| 2,979,668 | Dunlap | Apr. 11, 1961 |
| 2,982,906 | Green | May 2, 1961 |